L. W. DUNBAR.
ELECTROMAGNETIC CHUCK.
APPLICATION FILED JUNE 21, 1918.
1,339,553.
Patented May 11, 1920.
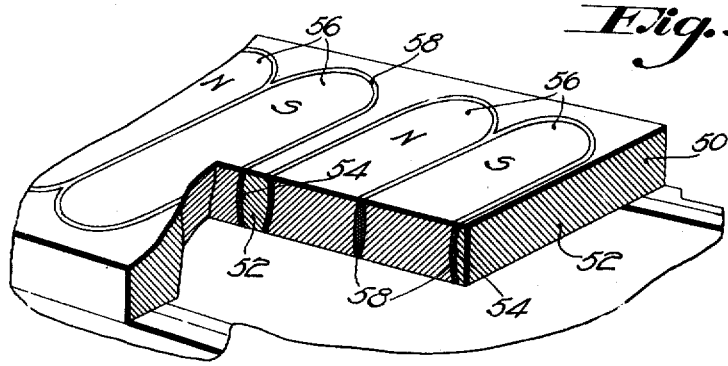
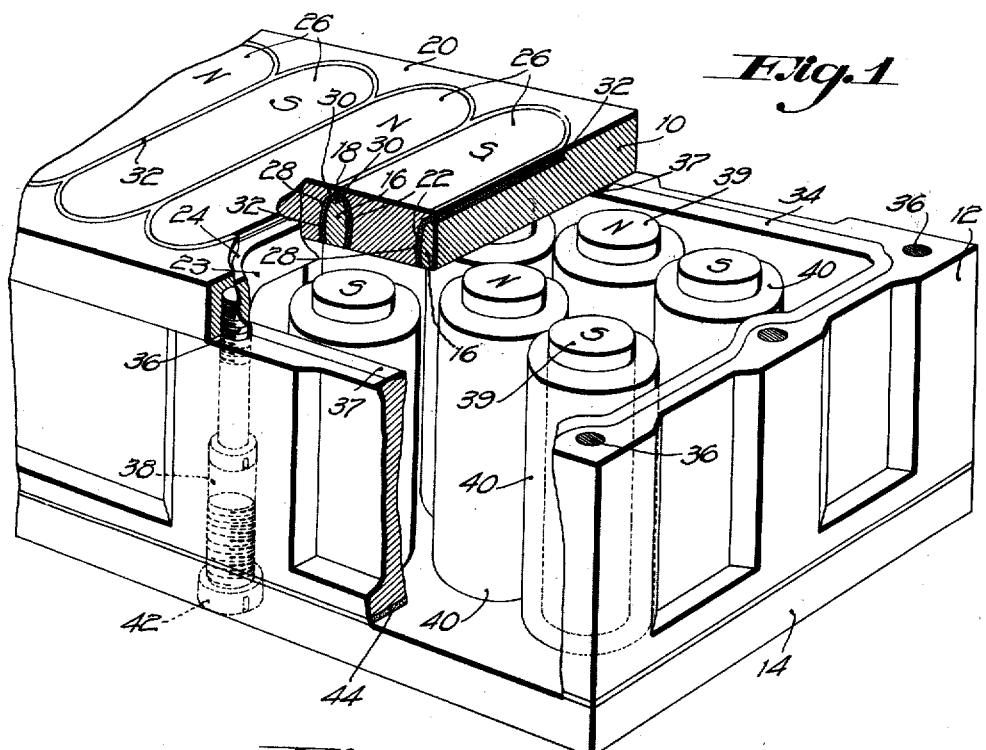

UNITED STATES PATENT OFFICE.

LEON W. DUNBAR, OF WORCESTER, MASSACHUSETTS.

ELECTROMAGNETIC CHUCK.

1,339,553.   Specification of Letters Patent.   Patented May 11, 1920.

Application filed June 21, 1918. Serial No. 241,175.

*To all whom it may concern:*

Be it known that I, LEON W. DUNBAR, a citizen of the United States, residing at Worcester, in the county of Worcester and State of Massachusetts, have invented certain new and useful Improvements in Electromagnetic Chucks; and I do hereby declare the following to be a full, clear, and exact description of the invention, such as will enable others skilled in the art to which it appertains to make and use the same.

This invention relates to electro-magnetic chucks, and it has special reference to chucks for magnetically holding pieces of work in position while being subjected to machine operations, such as milling, planing, turning and grinding, or the like.

One of the objects of the present invention is to provide a chuck that is simple, compact, durable, and relatively inexpensive in construction, and effective, reliable and efficient in operation.

Another object is to provide a chuck, the parts of which are so arranged that substantially the entire area of the working face is magnetized, there being practically no dead spaces.

A further object is to provide a chuck in which the pole-pieces are energized by electro-magnets that are so arranged and connected that the entire working face of the chuck is magnetized even though one of the electro-magnets becomes inoperative.

A still further object of the invention is to provide a chuck having its electrical parts enveloped and protected by a water-tight casing that may be conveniently removed and replaced for purposes of repair or renewal.

Accordingly, one feature of the invention resides in a top-plate having a plurality of separated narrow ribs that have their upper surfaces somewhat below the level of the face of the plate and which support a plurality of pole-pieces that are inserted between the ribs and are provided with laterally projecting upper flanges that practically overlap the supporting ribs. Thus, the flanges of adjacent pole-pieces are but slightly spaced apart, whereby the dead spaces of the chuck are reduced to a minimum.

Another feature of the invention resides in the employment of sets of independent electro-magnets for the respective pole-pieces, the alternate sets being oppositely magnetized, whereby the alternate pole-pieces have opposite polarities. The electro-magnets are connected in series-parallel relation, each parallel circuit including in series circuit one electro-magnet of each set. Thus, if one electro-magnet burns out or becomes otherwise inoperative, no part of the chuck is rendered dead, but all of the pole-pieces continue to be magnetized by the electro-magnets in the remaining circuits, whereby the entire working area of the chuck is maintained in operative condition. Obviously, any circuit connections which separately and independently energize the electro-magnets of each set may be employed.

A still further feature of the invention lies in the construction of the inclosing casing or box, which comprises a top-plate that carries the pole-pieces and which is rigidly secured to the upper edges of a rectangular side-frame, a water-tight joint being provided between them by calking the joint after the parts are secured together with suitable water-proof material. Having initially and permanently attached together the top-plate and side-frame, they constitute, in effect, a unitary member of the casing and need never be detached. This unitary member is detachably secured to a bottom-plate, and a water-tight joint is insured by employing a suitable gasket between them. The electro-magnets of the chuck are thus adequately protected and may be conveniently removed for replacement or repairs by detaching the unitary member from the bottom-plate.

Other objects of the invention and features by which they are attained will become apparent from the following description of the preferred embodiment thereof, which is illustrated in the accompanying drawings, in which Figure 1 is a perspective view, partially in section, of a portion of a chuck constructed in accordance with the invention, certain parts thereof being removed for the sake of clearness; Fig. 2 is a diagrammatic view, illustrating the electrical connections of the chuck; and Fig. 3 is a perspective view, partially in section, of a portion of a modified form of top-plate.

Referring to Fig. 1 of the drawings, the preferred form of the invention illustrated therein comprises a top-plate 10, a side-frame 12, and a bottom-plate 14, which are secured together to form a casing or box for inclosing and protecting the electrical parts of the chuck. The top-plate 10 is preferably and conveniently made of cast iron, although any suitable material may be used, and is provided with a plurality of elongated openings that are separated by a plurality of equally spaced ribs 16. The ribs 16 are relatively narrow and the upper surfaces 18 thereof are disposed somewhat below the general working surface 20 of the chuck. The sides 22 of the ribs 16 are preferably convexly curved in form, while the opposite ends 23 of the openings in the top-plate are preferably circular, being convexly curved similar to the sides of the ribs 16. A groove 24 is provided in the top-plate around the circular ends 23 of the openings.

Inserted between the ribs 16 and supported thereby are a plurality of elongated pole-pieces 26 of good magnetizable material, such as mild or machine steel. The sides 28 of each of the pole-pieces 26 are concave in form to correspond to the convexly curved sides of the ribs 16, and each pole-piece is provided around its periphery with an outwardly projecting upper flange 30. The relative dimensions of the pole-pieces 26 and the spacing of the ribs 16 are so chosen that the pole-pieces may be inserted between the ribs so that the upper flanges 30 project over the ribs, whereby the flanges of the adjacent pole-pieces are in proximity. The pole-pieces 26 are preferably secured in position by a suitable non-magnetizable metal 32, such as linotype metal, which expands when cooled and which is poured in between the pole-pieces 26 and the ribs 16. With this construction it is evident that the pole-pieces 26 cover substantially the entire working face of the chuck, and the only dead spaces are those formed by the non-magnetizable material 32 which is interposed between the closely adjacent flanges 30 of the adjacent pole-pieces.

The side-frame is preferably, but not necessarily, of cast-iron, and is conveniently of rectangular form to correspond with that of the top-plate 10 and is open at both its top and bottom. The upper inner edge of the side-frame 12 is beveled off at 34 to provide an angular space between the top-plate 10 and the side-frame 12 when said members are secured together by means of a plurality of bolts 36 that are located within openings 38 in the side-frame 12 and which are threaded into suitable openings in the top-plate 10.

After the top-plate 10 is rigidly bolted to the side-frame 12 in the manner just indicated, the angular space between them, provided by the bevel 34 of the side-frame, is filled or calked with suitable water-proof material 37, so that a water-tight joint is insured. Having once assembled the top-plate 10 and side-frame 12 in the manner just described, they constitute in effect a single unitary member of the casing and, to all intents and purposes, are permanently secured together and may be handled as a unit.

The bottom-plate 14 is of good magnetizable material, such as annealed cast-iron or semi-steel, and is provided with a plurality of integral cylindrical cores 39 that are disposed in pairs or sets and project upwardly into engagement with the respective pole-pieces 26, a set of two cores 39 being provided for each pole-piece. For compactness, and effective and efficient operation, each set of cores 39 is slightly staggered, as shown in Figs. 1 and 2. The cylindrical form of the cores also contributes to efficient operation, since with this form, the magnetic losses are a minimum.

The alternate pole-pieces 26 inserted in the top-plate 10 are magnetized with opposite polarities by means of a plurality of annular magnetizing coils 40 that are placed over and surround the respective cores 39. The coils 40 associated with each set of cores 39 are wound to similarly magnetize the associated pole-piece, while the several sets of coils are alternately wound to cause the alternate pole-pieces to have opposite polarities. Thus, if the magnetizing coils 40 of the first set of cores 39 produce south poles at the upper ends thereof, the next set of coils produces north poles at the upper ends of their cores, while the third set produces south poles, and so on.

The magnetizing coils 40 of the chuck are connected in series-parallel relation, one coil of each set being connected in series circuit A, and the other coil thereof in an independent series circuit B, that is, in parallel relation to the first circuit, as indicated in Fig. 2. By thus connecting one magnetizing coil 40 of each set in separate and independent circuits, it is evident that even if some one of the coils burns out or becomes otherwise inoperative, there still remains one coil of each set to magnetize each of the pole-pieces 26, so that no part of the working surface of the chuck is rendered dead, but all of it is maintained alive and in working condition. Obviously, more than two electromagnets for each pole-piece may be employed, in which case, there will be a corresponding number of parallel electrical circuits. Moreover, any other circuit connections by means of which each coil of each set is energized independently of the other coils may be employed.

Since the top-plate 10 and the side-frame 12 are practically permanently secured together to form a unitary member of the casing, it becomes necessary to make provision for removing this member to permit of repairs and renewals of the magnetizing coils 40 in the event of accidents.

This unitary member, therefore, is detachably secured to the bottom-plate 14 by means of a plurality of bolts 42 that project through the bottom-plate and are threaded into the same openings 38 within the side-frame 12 that receive the bolts 36 for bolting the top-plate 10 to said side-frame. A water-tight joint is provided between the unitary member and the bottom-plate 14, by employing a gasket 44 of lead or other suitable material.

Thus, a compact and rugged structure is provided in which the electrical elements are fully protected from moisture by a casing that may be opened up with facility to render the electrical parts accessible, and the effectiveness and continuity of operation throughout the entire working surface of the chuck is insured by the arrangement and connections of the magnetizing coils.

Another valuable feature of the invention resides in the efficiency of the chuck that results from the employment of relatively short magnetic circuits and cylindrical cores, whereby the iron losses are very low and substantially all of the electrical energy supplied is devoted to a useful purpose.

Referring to the modification of the top-plate construction illustrated in Fig. 3, a top-plate 50 is provided with a plurality of openings that are separated by integral ribs 52 that have convexly curved sides 54 and which extend the full thickness of the plate. A pair of similar pole-pieces 56 are inserted in the openings between each pair of ribs 52 and are secured in position by suitable non-magnetizable material 58 that expands when cooled, in the same manner as already set forth in connection with the construction illustrated in Fig. 1. With this construction, the respective pairs of pole-pieces 56 are separated by a rib 52 which constitutes a dead space, although the pole-pieces of each pair are in close proximity, being separated only by the film of non-magnetizable metal 58 interposed between them. The cores for magnetizing the pole-pieces 56 will of course be located in accordance with the positions of the pole-pieces.

Obviously, the invention is not restricted to the particular arrangement and location of parts shown and described, and many modifications may be made therein without departing from the spirit and scope of the invention. Only such limitations should be imposed as are indicated in the appended claims.

Having set forth the preferred embodiment of the invention, that which is claimed as new is:—

1. An electro-magnetic chuck, having, in combination, a casing having a top-plate provided with a plurality of magnetizable pole-pieces, and means for magnetizing alternate pole-pieces with opposite polarities, said means comprising a plurality of sets of cores severally disposed in magnetic relation to the pole-pieces, the cores of each set being similarly and independently magnetized.

2. An electro-magnetic chuck having, in combination, a casing provided with a top-plate having a plurality of pole-pieces inserted therein, a plurality of magnetizable cores disposed in magnetic relation to each of said pole-pieces, magnetizing coils disposed upon each of said cores, and a plurality of independent electrical circuits each including one magnetizing coil for each pole-piece.

3. An electro-magnetic chuck having, in combination, a casing provided with a top-plate having a plurality of magnetizable pole-pieces inserted therein, and means disposed within said casing for magnetizing the alternate pole-pieces with opposite polarities and comprising a plurality of sets of electro-magnets in magnetic relation to said pole-pieces, and a plurality of independent parallel magnetizing circuits severally including one electro-magnet of each set.

4. An electro-magnetic chuck having, in combination, a casing provided with a top-plate having a plurality of magnetizable pole-pieces inserted therein, and means disposed within said casing for magnetizing the alternate pole-pieces with opposite polarities and comprising a plurality of independently energized electro-magnets for each pole-piece whereby the magnetization of each pole-piece is maintained though one of said electro-magnets for said pole-pieces becomes inoperative.

5. An electro-magnetic chuck having, in combination, a casing provided with a top-plate having a plurality of magnetizable pole-pieces inserted therein and constituting substantially the entire area of the top-plate, and means for magnetizing alternate pole-pieces with opposite polarities, said means comprising a plurality of electro-magnets for each pole-piece disposed within said casing, the electro-magnets for each pole-piece being independently connected with respect to each other and in circuit with corresponding electro-magnets for the other pole-pieces whereby the magnetization of substantially the entire area of the top-plate is maintained even though one of the electro-magnets becomes inoperative.

6. An electro-magnetic chuck having, in combination, a casing having a top-plate provided with spaced ribs, the upper surfaces of which are below the surface of the top-plate, and a plurality of magnetizable pole-pieces inserted between said ribs and having laterally projecting upper flanges partially overlapping the upper surfaces of the ribs and lying in the plane of the top-plate surface.

7. An electro-magnetic chuck, having, in combination a casing having a top-plate provided with spaced ribs, and a plurality of magnetizable pole-pieces disposed between said ribs and having laterally projecting upper flanges partially overlapping the upper surfaces of said ribs.

8. An electro-magnetic chuck having, in combination, a casing having a top-plate provided with spaced ribs having convexly curved sides, and a plurality of magnetizable pole-pieces inserted between said ribs and having concave sides and laterally projecting upper flanges overlapping said ribs, and non-magnetizable material disposed between said pole-pieces and said ribs for holding said pole-pieces in position.

9. An electro-magnetic chuck having, in combination, a casing provided with a top-plate having a plurality of openings having grooves around their upper peripheries, and a plurality of magnetizable pole-pieces inserted into said openings and having laterally projecting peripheral upper flanges that extend into said peripheral grooves.

10. An electro-magnetic chuck having, in combination, a casing comprising a top-plate having magnetizable pole-pieces set therein, a side-frame, and a magnetizable bottom-plate having integral magnetizable cores projecting into engagement with said pole-pieces.

11. An electro-magnetic chuck having, in combination, a casing comprising a top-plate having magnetizable pole-pieces set therein, a side-frame, a magnetizable bottom-plate having magnetizable cores associated therewith and projecting into magnetic relation with said pole-pieces, means interposed between said top-plate and said side-frame for insuring a permanent tight joint between the top-plate and said side-frame, and means for detachably securing said bottom plate to said side-frame.

12. An electro-magnetic chuck having, in combination, a casing comprising a side-frame, a top-plate permanently fixed thereto, means interposed between said side-frame and top-plate for providing a calked water-tight joint between them, and a bottom-plate detachably secured to said side-frame.

13. An electro-magnetic chuck having, in combination, a casing comprising a side-frame having a beveled upper and inner edge, and a top-plate engaging the upper edge of said side-frame and rigidly secured thereto to form a unitary member, the joint between the top-plate and the side-frame being made watertight by calking with filling material the angular space between them provided by said beveled edge.

14. An electro-magnetic chuck having, in combination, a casing comprising a side-frame having a plurality of bolt-holes, a top-plate engaging the upper surface of said side-frame, bolts set into said bolt-holes for securing said top-plate to said side-frame to form a substantially unitary member, a bottom-plate upon which said unitary member rests, and bolts extending through said bottom-plate and into said bolt-holes for detachably securing said unitary member to said bottom-plate.

15. An electro-magnetic chuck having, in combination, a casing comprising a top-plate, a rectangular side-frame rigidly and tightly secured thereto to form a unitary member, a bottom-plate detachably and tightly secured to said unitary member, a plurality of magnetizable cores associated with said bottom-plate and projecting within said casing, and a plurality of magnetizing coils disposed within said casing and around said cores and removable therefrom by detaching said unitary member from said bottom-plate.

16. An electro-magnetic chuck having, in combination, a casing provided with a top-plate having a plurality of spaced ribs, a pair of magnetizable pole-pieces of opposite polarities inserted between and positioned by each pair of ribs, and means disposed within said casing in magnetic relation to said pole-pieces for effecting the magnetization thereof.

LEON W. DUNBAR.